United States Patent
Munro et al.

(10) Patent No.: US 11,724,766 B2
(45) Date of Patent: Aug. 15, 2023

(54) MOUNT AND MOUNTING SYSTEM FOR AUXILIARY HANDLEBARS

(71) Applicant: Kids Ride Shotgun Limited, Tauranga (NZ)

(72) Inventors: Stuart Gregory Munro, Tauranga (NZ); Thomas Charles Hayward, Mount Maunganui (NZ)

(73) Assignee: Kids Ride Shotgun Limited, Tauranga (NZ)

( * ) Notice: Subject to any disclaimer, the term of this patent is extended or adjusted under 35 U.S.C. 154(b) by 0 days.

(21) Appl. No.: 17/644,458

(22) Filed: Dec. 15, 2021

(65) Prior Publication Data

US 2023/0182852 A1    Jun. 15, 2023

(51) Int. Cl.
*B62K 21/12*    (2006.01)

(52) U.S. Cl.
CPC ................................. *B62K 21/125* (2013.01)

(58) Field of Classification Search
CPC ...................................................... B62K 21/125
See application file for complete search history.

(56) References Cited

U.S. PATENT DOCUMENTS

| | | | | |
|---|---|---|---|---|
| 4,355,922 A | * | 10/1982 | Sato | E04G 7/16 403/3 |
| 5,163,339 A | * | 11/1992 | Giard, Jr. | B62K 21/125 74/551.8 |
| 6,331,089 B1 | | 12/2001 | Iteya | |
| 2007/0119888 A1 | | 5/2007 | Chuang | |
| 2008/0219760 A1 | | 9/2008 | Wu et al. | |
| 2010/0186545 A1 | * | 7/2010 | Ray | B62K 21/125 74/551.8 |
| 2016/0025121 A1 | * | 1/2016 | Ahnert | F16B 2/185 403/373 |

FOREIGN PATENT DOCUMENTS

| | | | |
|---|---|---|---|
| CN | 201140741 Y | 10/2008 | |
| CN | 201186718 Y | 1/2009 | |
| CN | 102700670 A | 10/2012 | |
| DE | 29616622 U1 * | 11/1996 | ........... B62K 21/125 |
| DE | 20016839 U1 | 12/2000 | |
| JP | H0637086 U | 5/1994 | |
| NL | 9201686 A | 4/1994 | |
| WO | 2009/065973 A1 | 5/2009 | |

OTHER PUBLICATIONS

Extended European Search Report for corresponding EP Application No. 22213461.1-1009 dated May 15, 2023.

* cited by examiner

*Primary Examiner* — Vicky A Johnson
(74) *Attorney, Agent, or Firm* — Finnegan, Henderson, Farabow, Garrett & Dunner, LLP

(57) ABSTRACT

A mount for an auxiliary handlebar, the mount comprising: a stem; a fastener configured to receive the auxiliary handlebar; a clamp configured to secure the mount to a primary handlebar; and a clamp lock comprising: a linkage rotatably connected to the stem; and a cam lever rotatably connected to the linkage; wherein the clamp lock is configured to selectively lock the clamp.

14 Claims, 11 Drawing Sheets

MOUNT AND MOUNTING SYSTEM FOR AUXILIARY HANDLEBARS

FIELD

This disclosure relates to a mount for an auxiliary handlebar and a mounting system that uses such a mount.

BACKGROUND

Riders of bicycles and other similar vehicles use handlebars to control the vehicle. An additional passenger, such as a child, may ride alongside the rider. Auxiliary handlebars can be mounted to the handlebars for use by the additional passenger.

SUMMARY

According to one example, there is provided a mount for an auxiliary handlebar comprising a stem; a fastener configured to receive the auxiliary handlebar; a clamp configured to secure the mount to a primary handlebar; and a clamp lock comprising: a linkage rotatably connected to the stem; and a cam lever rotatably connected to the linkage; wherein the clamp lock is configured to selectively lock the clamp.

Examples may be further implemented according to any one of dependent claims 2 to 14.

Further provided is a mounting system comprising two such mounts. Examples may be further implemented according to dependent claim 16.

BRIEF DESCRIPTION OF THE DRAWINGS

The description is framed by way of example with reference to the drawings which show certain embodiments. However, these drawings are provided for illustration only, and do not exhaustively set out all embodiments.

DETAILED DESCRIPTION

Bicycles and other vehicles typically include (primary) handlebars that are used by the rider. If an additional passenger, such as a child, wishes to also ride the bicycle, then they may ride in front of the rider. They can grasp the primary handlebars although this may be uncomfortable and may not be safe if the additional passenger manipulates the controls, such as the brakes and gears, of the vehicle. Auxiliary handlebars may be provided for the additional rider to use. The auxiliary handlebars may be mounted to the primary handlebars.

Figure 1A:
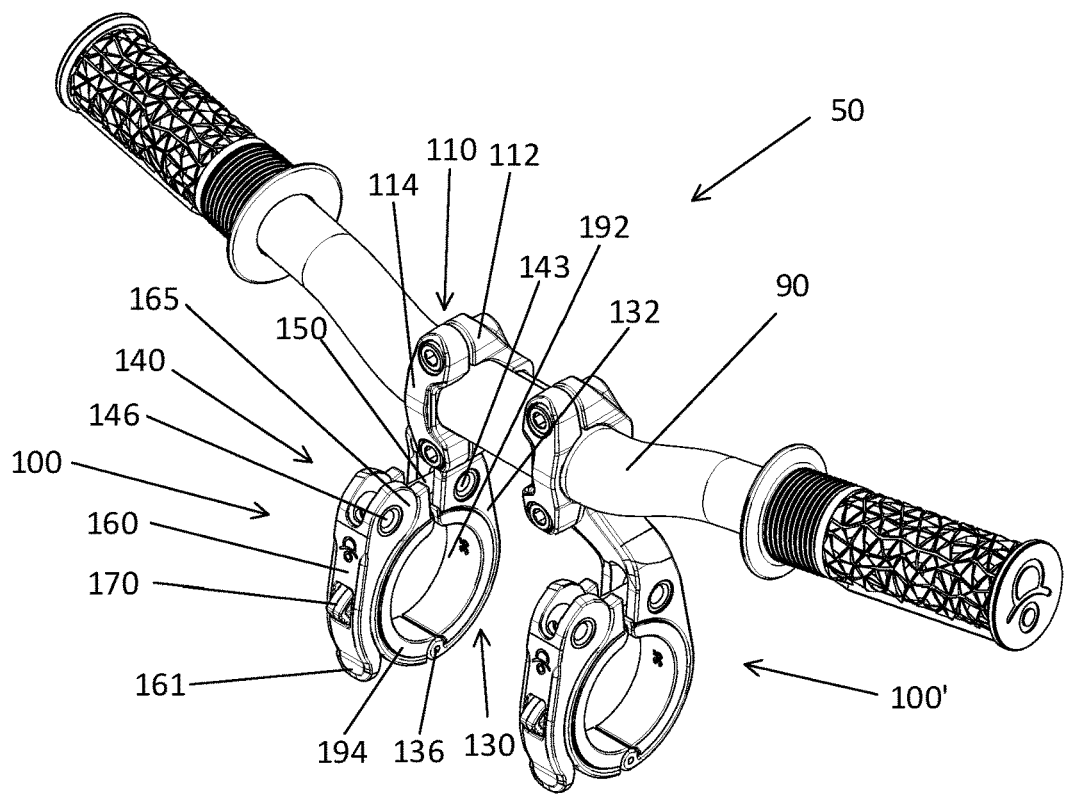
FIG. 1A depicts an example of a locked mounting system for auxiliary handlebars.

FIG. 1A depicts an example of a mounting system 50 for auxiliary handlebars 90. Mounting system 50 comprises two mounts 100 and 100'. Mount 100 (which is also shown in profile in FIG. 1B) comprises a fastener 110, a stem 120, and a clamp 130. The fastener 110 is configured to receive auxiliary handlebars 90 and is used to secure the auxiliary handlebars 90 to the mount 100. In the example mount shown in the drawings, fastener 110 comprises first portion 112 and second portion 114 that define an aperture for auxiliary handlebars 90. The first portion 112 is integrated with stem 120 while the second portion 114 is removable and is affixed to mount 100 when in use.

Stem 120 is a structural component that connects fastener 110 to clamp 130. The shape and configuration of the stem 120 at least partially determines the position and orientation of the auxiliary handlebars 90 with respect to the primary handlebars (shown in FIG. 11) when the mount 100 is installed and is in use.

Figure 11:
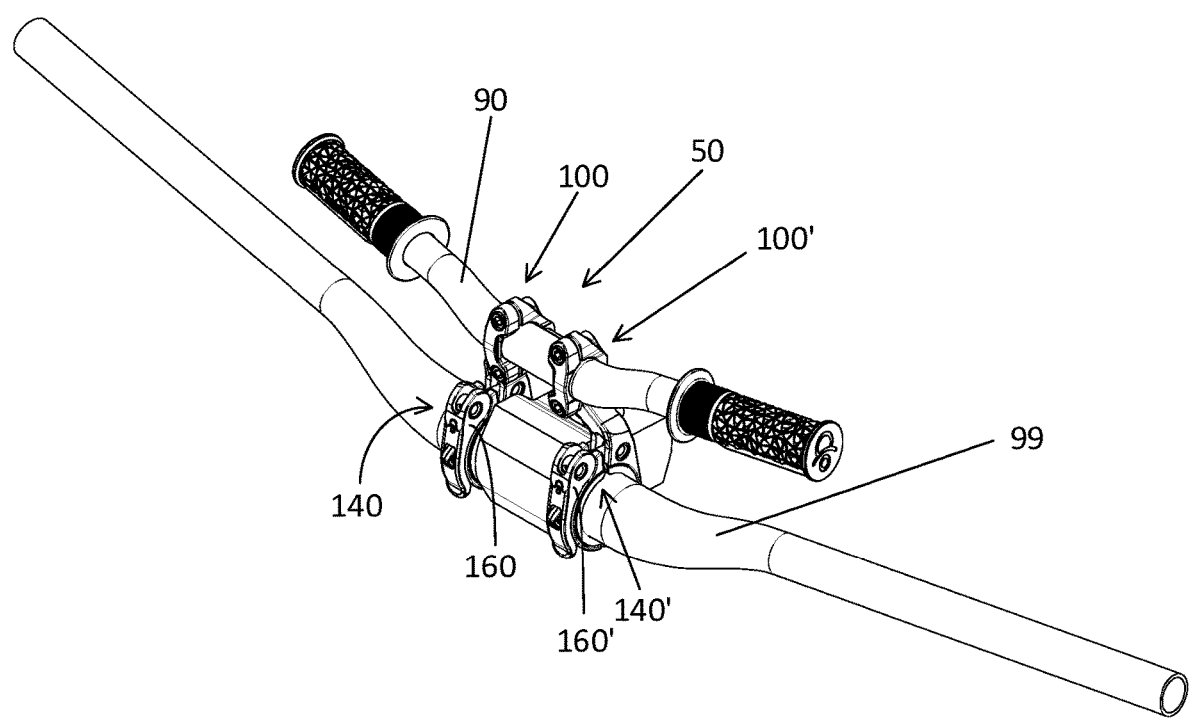
FIG. 11 shows a mounting system attached to primary handlebars.

Clamp 130 is configured to secure the mount 100 to the primary handlebars (as shown in FIG. 11). In the depicted example of mount 100, the clamp 130 comprises a first portion 132 that is integral with stem 120 and a second portion 134 that is rotatably connected to the first portion 132 about pivot 136. The clamp 130 can be opened or closed about the primary handlebars by rotating the second portion 134 about pivot 136. The shape, size, and/or configuration of the interior surfaces of the first portion 132 and/or second portion 134 may be at least partially determined using one or more removable inserts 192 and 194 as described in more detail below. The clamp 130 can be formed at least partially of a metal (such as aluminium), although other suitable materials can also be used.

The mount 100 further comprises a clamp lock 140 configured to selectively lock the clamp 130. The clamp lock can lock the clamp by hand, without a user having to use a separate tool. In this example, the clamp lock 140 comprises a linkage 150 that is rotatably connected to stem 120 about pivot 143 and cam lever 160 that is rotatably connected to linkage 150 about pivot 146. The cam lever 160 comprises cam lobe 165 that is received by complementary-shaped seat 138 defined by the second portion 134 of clamp 130. The cam lever 160 and/or linkage 150 can be formed at least partially of a plastic, although other suitable materials can also be used.

Figure 2A:
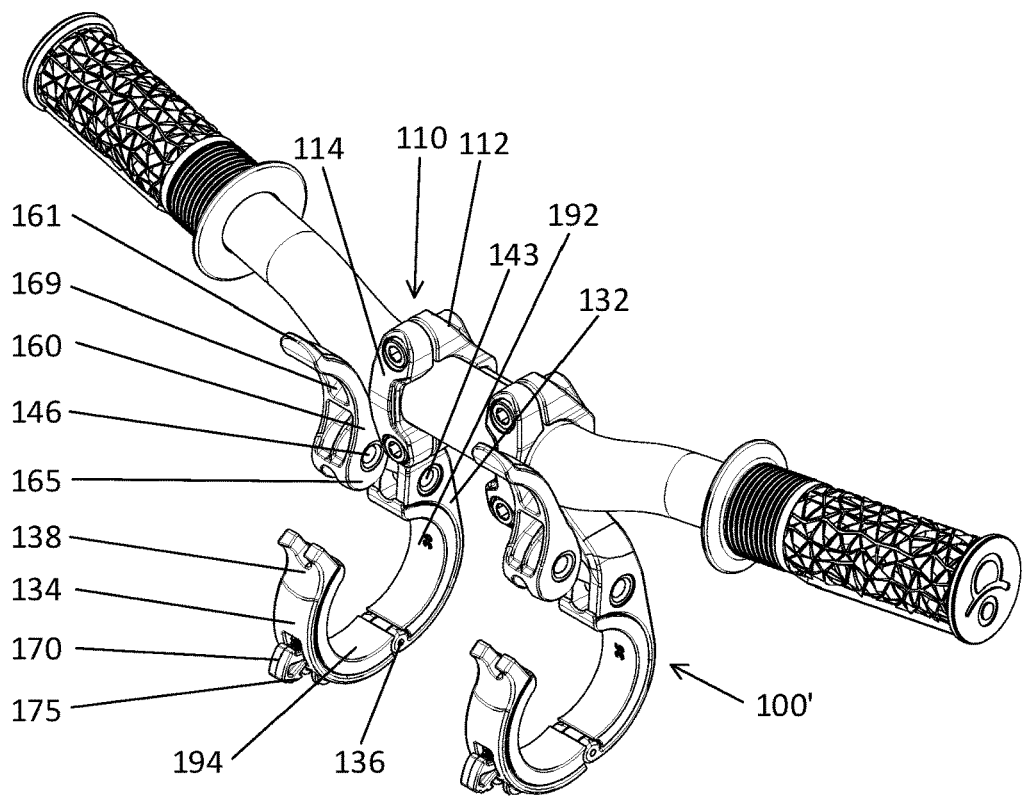
FIG. 2A depicts the mounting system shown in FIG. 1A in an unlocked configuration.
Figure 2B:
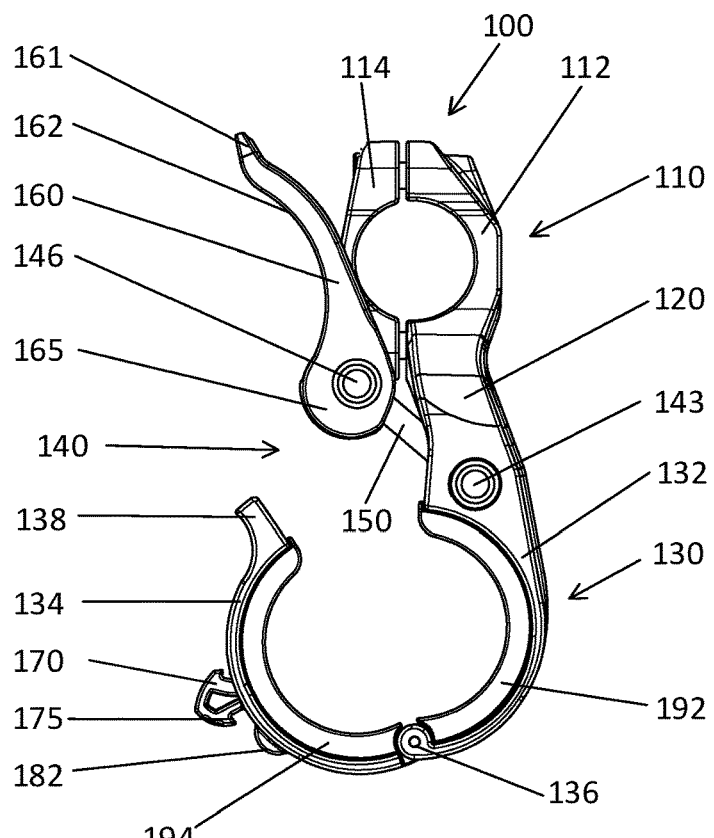
FIG. 2B depicts the mount shown in FIG. 1B in an unlocked configuration.
Figure 3A:
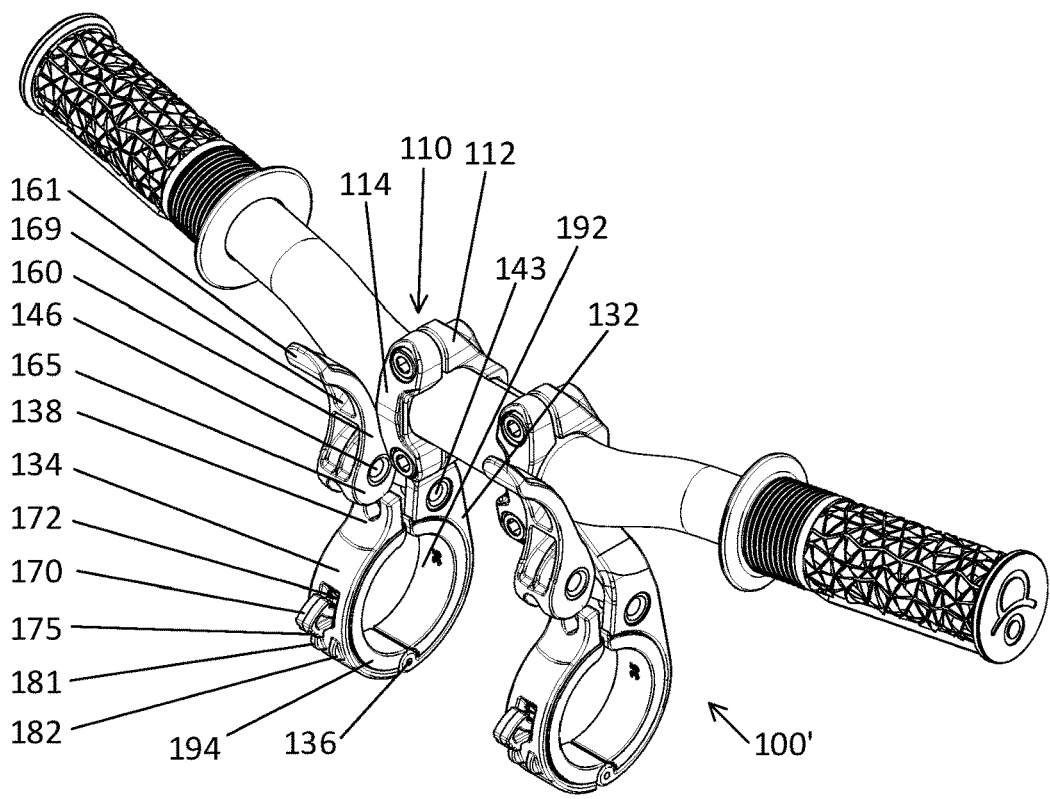
FIG. 3A depicts the mounting system shown in FIG. 1A in the process of being locked.
Figure 3B:
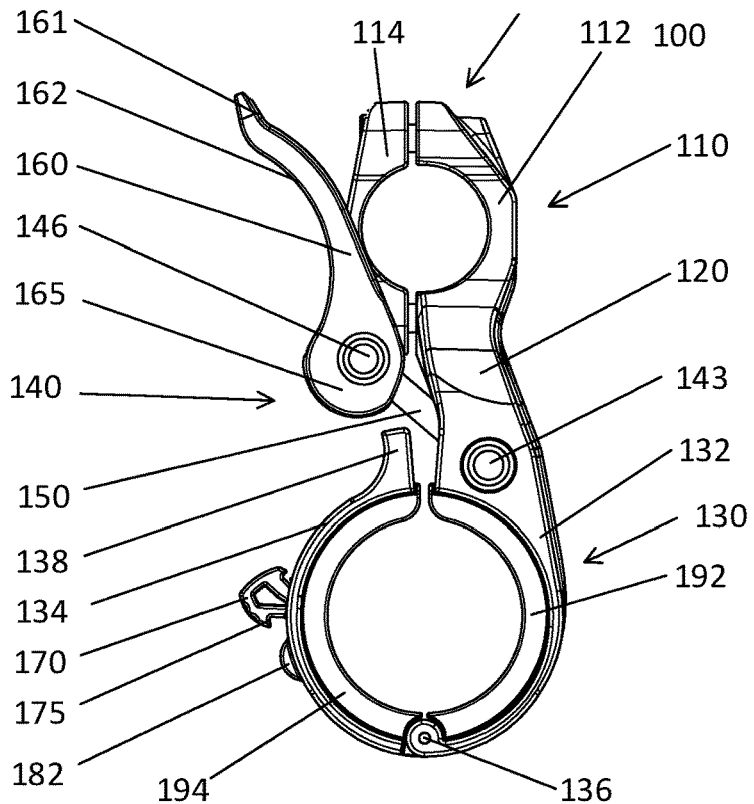
FIG. 3B depicts the mount shown in FIG. 1B in the process of being locked.

The cam lobe 165 is eccentrically shaped so that the arcuate circumference of the cam lobe 165 bears against seat 138 when the cam lever 160 is rotated about pivot 146. The cam lever 160 of the examples depicted is generally arcuate in shape and has a rear surface 162 (indicated, for example, in FIG. 2B) that complements the exterior surface of the second portion 134 of the clamp 130. In the examples depicted, the distal end 161 of cam lever 160 is slightly raised for easier manipulation of cam lever 160.

The clamp 130 is selectively locked by clamp lock 140 by closing clamp 130 about the primary handlebars, rotating linkage 150 about pivot 143 by bringing cam lobe 165 towards seat 138, and rotating cam lobe 165 within seat 138 by pivoting cam lever 160 about pivot 146. The clamp lock 140 is shown in a locked configuration in FIGS. 1A and 1B.

Locking Action

FIGS. 2A to 5B sequentially show the two-stage locking process of clamp lock 140 in profile view and in perspective. The primary handlebars have been omitted in these figures for clarity. Clamp 130 is shown in an open position in FIGS. 2A and 2B. Second portion 134 of clamp 130 can freely rotate about pivot 136 in this configuration so that the clamp 130 can receive the primary handlebars. The clamp lock 140 is unlocked in these figures and linkage 150 and cam lever 160 are rotated upwards about their respective pivots 143 and 146. Once the mount 100 and clamp 130 are in position about the primary handlebars, second portion 134 of clamp 130 is rotated about pivot 136 to close the clamp 130 as shown in FIGS. 3A and 3B. The clamp lock 140 remains unlocked at this stage and the positions of linkage 150 and cam lever 160 remain unchanged.

Figure 4A:
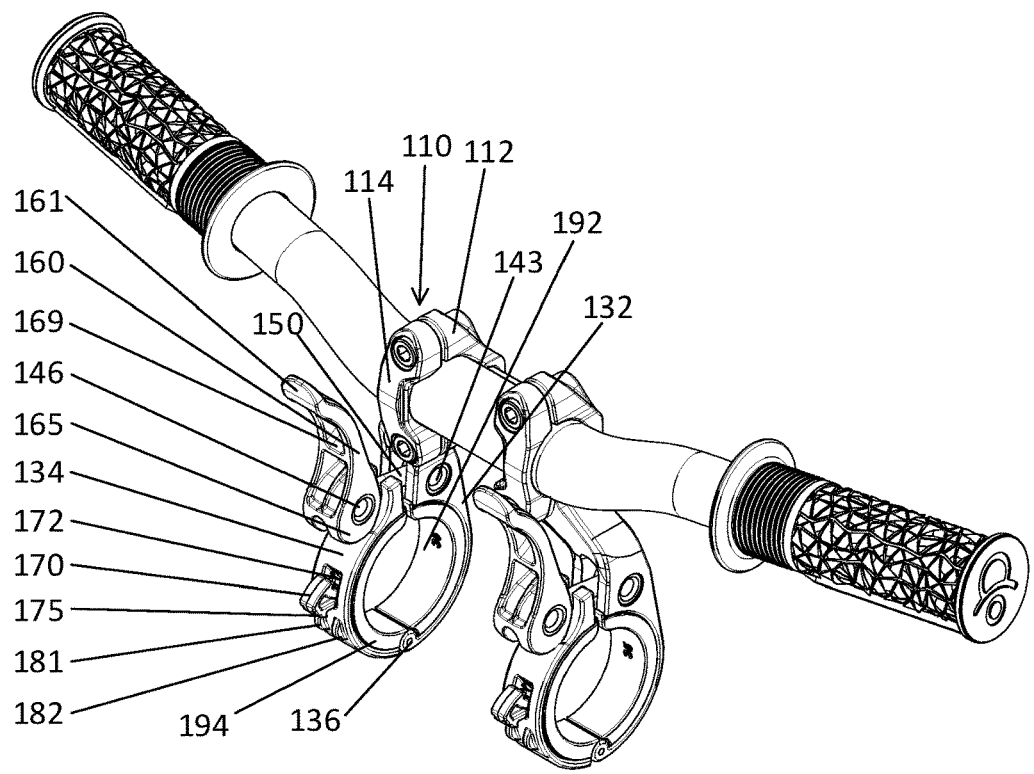
FIG. 4A further depicts the mounting system shown in FIG. 1A in the process of being locked.
Figure 4B:
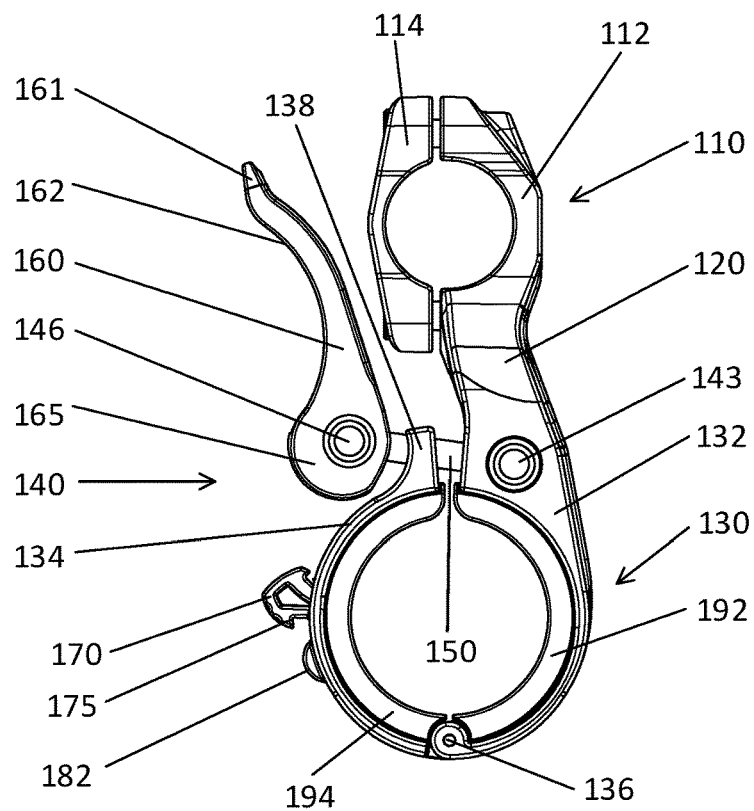
FIG. 4B further depicts the mount shown in FIG. 1B in the process of being locked.

Once the second portion 134 of the clamp 130 has been rotated to close clamp 130, the linkage 150 is rotated downwards about pivot 143 to bring the linkage 150 and the pivot 146 of cam lobe 165 into position (as shown in FIGS. 4A and 4B). The cam lobe 165 does not necessarily engage with seat 138 at this stage.

Figure 5A:
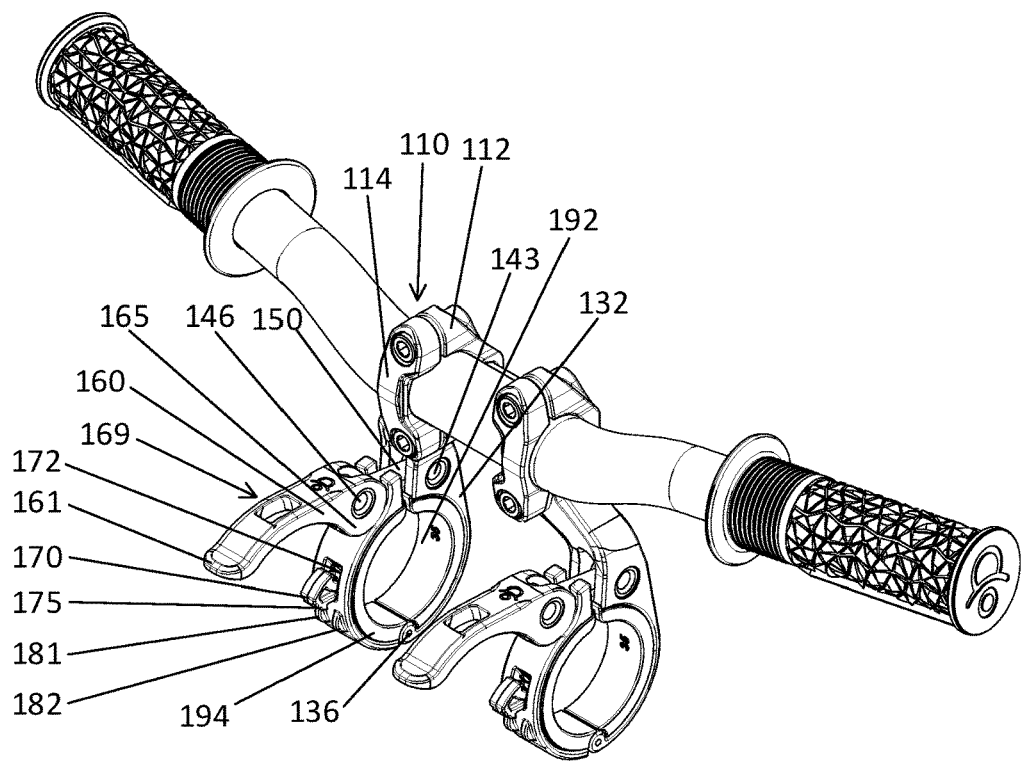
FIG. 5A further depicts the mounting system shown in FIG. 1A in the process of being locked.
Figure 5B:
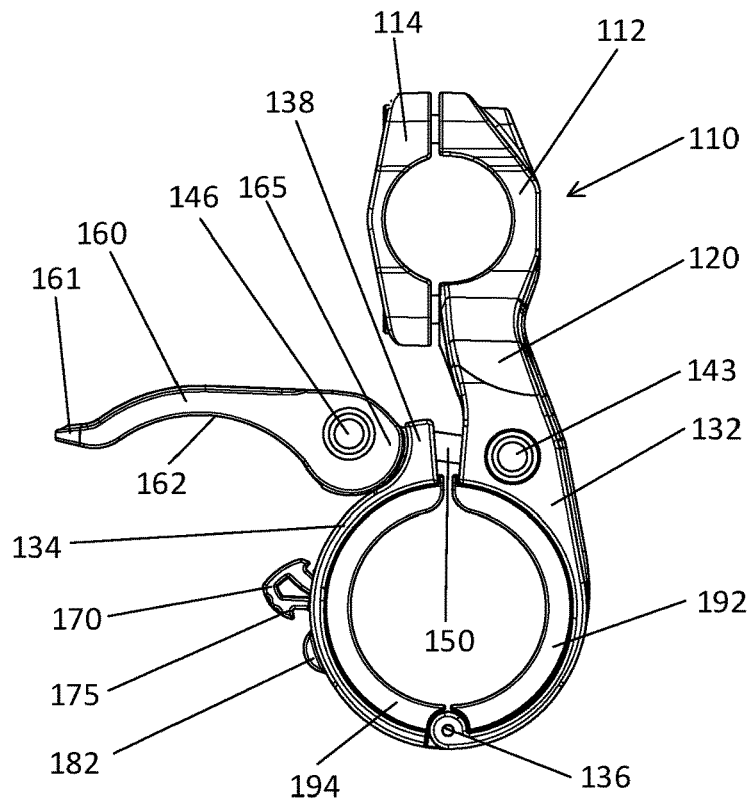
FIG. 5B further depicts the mount shown in FIG. 1B in the process of being locked.

After linkage 150 has been rotated to bring pivot 146 of cam lobe 165 into place, cam lobe is rotated within seat 138 by rotating cam lever 160 about pivot 146. The heel of cam lobe 165 begins to engage seat 138 as the cam lever 160 is rotated about pivot 146, as shown in FIGS. 5A and 5B.

The selective locking of the clamp 130 is then completed by rotating the cam lever 160 about pivot 146 so that the rear surface 162 of cam lever 160 is flush with the exterior surface of the second portion 134 of clamp 130. This rotation about pivot 146 forces the heel of cam lobe 165 against seats 138 due to the eccentricity of cam lobes 165, thereby urging the second portion 134 of clamp 130 towards the first portion 132 of clamp 130 and locking the clamp 130 about the primary handlebars. This is shown in FIGS. 1A and 1B.

In some embodiments, the cam lever 160 may be rotated about pivot 146 to alter the distance between cam lobe 165 and pivot 143. The effect of this is to adjust the force placed by the cam lobe 165 against the seat 138. This in turn can be used to adjust the clamping pressure of the clamp 130 against the primary handlebars.

Cam Lobe and Seat

Figure 1B:
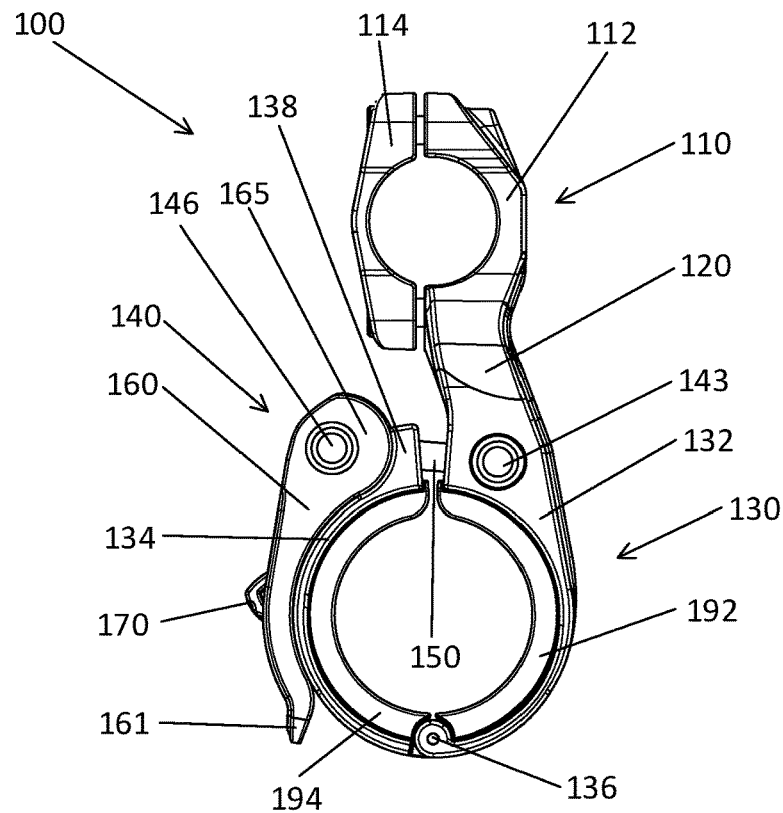
FIG. 1B depicts a profile view of an example of a mount for auxiliary handlebars.

FIGS. 1B and 5B show that the profiles of seat 138 and cam lobe 165 are complementary when viewed side-on so that cam lobe 165 bears against seat 138 to lock the clamp 130 in place. While a clamp lock with complementarily-profiled cam lobes and seats can adequately and securely lock the clamp about the primary handlebars, in some cases, linkage 150 and cam lever 160 can occasionally be forced slightly out-of-plane (that is, out of the plane of rotation shared by pivots 143 and 146) when cam lobe 165 bears against seat 138 if the linkage 150 has been misaligned during rotation about its connection 143 to the stem 120 if there is nothing to mitigate or prevent such rotation. Although the clamp lock may still sufficiently lock clamp 130 about the primary handlebars in these situations, the out-of-plane rotation may change the direction of the locking force provided by the cam lobe 165 bearing against seat 138 and may reduce the overall effectiveness of clamp lock 140.

Figure 6:
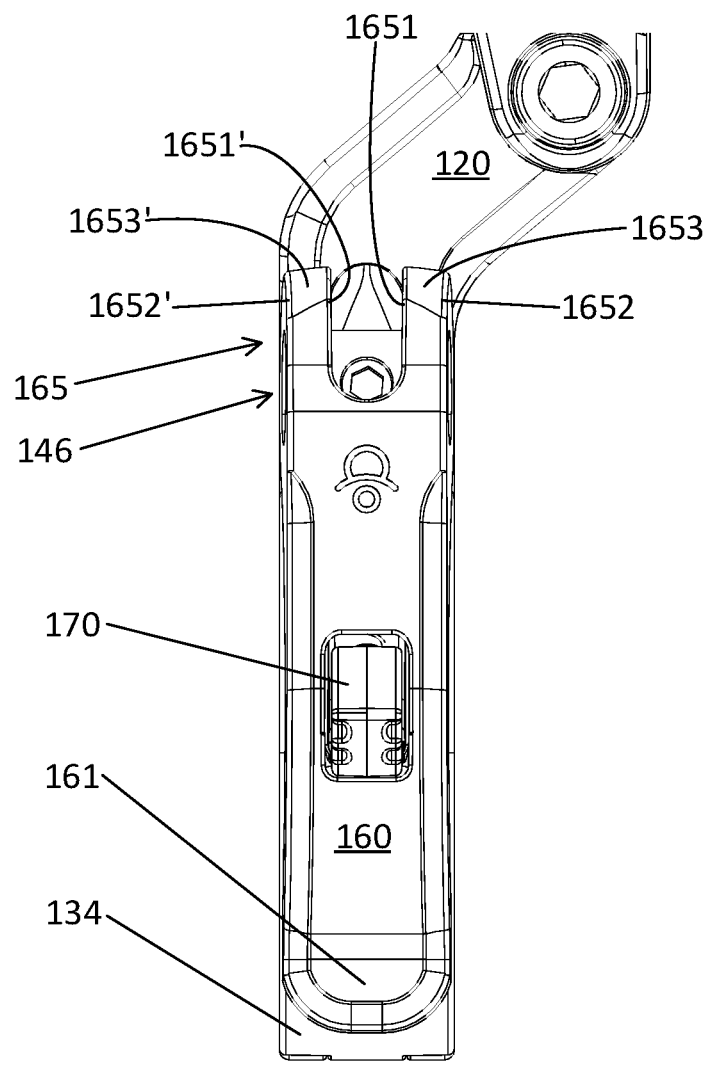
FIG. 6 shows a portion of the mount depicted in FIG. 1B from a front-on perspective.

To this end, the cam lobe 165 and/or seat 138 can be configured to mitigate out-of-plane rotation of cam lever 160. FIG. 6 shows a portion of mount 100 from a front-on perspective with the clamp lock 140 selectively locked (corresponding to FIGS. 1A and 1B). In this example of mount 100, cam lobe 165 is formed by two arcuate ridges that flank both sides of pivot 146. The inner walls 1651 and 1651' of each ridge extend further from the axis of rotation of pivot 146 than the outer walls 1652 and 1652' so that the top faces 1653 and 1653' of cam lobe 165 are slanted or inclined. These inclined top faces 1653 and 1653' run along the arcuate circumference of the cam lobe 165 and its heel.

Figure 7:
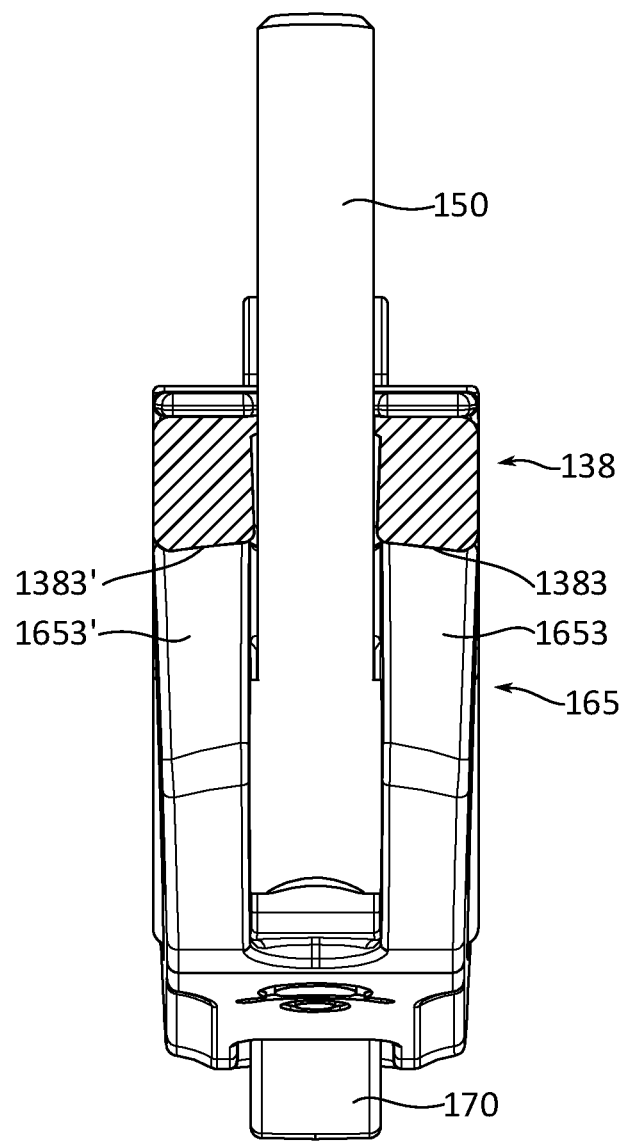
FIG. 7 shows a portion of the mount depicted in FIG. 1B from a top-down perspective.

FIG. 7 shows the cam lobe 165 and seat 138 when viewed from directly above. Seat 138 has been cross-hatched in this figure and several components of the mount are omitted for clarity. This perspective shows that the inclination of top faces 1653 and 1653' of cam lobe 165 gives the cam lobe 165 an overall convex shape with respect to seat 138. Similarly, the load-bearing faces 1383 and 1383' of seat 138 that receives the cam lobe 165 are complementarily inclined so that the seat 138 is generally concave with respect to cam lobe 165. This can help mitigate out-of-plane rotation of cam lever 160 during the locking process. Any out-of-plane rotation experienced by the cam lever 160 also causes convex faces 1653 and 1653' to likewise rotate out-of-plane, bringing them out of alignment with complementary faces 1383 and 1383'. As cam lever 160 is rotated down to bring cam lobe 165 to bear against seat 138, the generally convex faces 1653 and 1653' abut against the generally concave faces 1383 and 1383'. The misalignment between the faces urges the cam lever 160 back towards the plane of rotation and can substantially correct for any out-of-plane rotation. Furthermore, once the cam lever 160 is flush against clamp 130 (as shown in FIGS. 1A and 1B), the abutting faces 1653 and 1653' with 1383 and 1383' respectively help to prevent the cam lever 160 from being accidentally translated out-of-plane.

In the examples depicted, the cam lobe 165 is generally convex whilst the seat 138 is generally concave. However, this is not intended as a limitation, and other configurations can be used to help mitigate out-of-plane rotation of cam lever 160. In some examples, seat 138 may be generally convex whilst cam lobe 165 may be generally concave. Similarly, a mount may include multiple cam lobes and seats which have complementary shapes to help mitigate out-of-plane rotation. In still further examples, the cam lobes and seats may not be generally concave or convex and may have other shapes to help mitigate out-of-plane rotation of the cam lever. In other examples, the cam lobes and seats may include complementary projections and recesses that help mitigate out-of-plane rotation of cam lever 160. These may be alternative to or in addition to or complementary shapes or surfaces of the cam lobes and seats.

Catches

In some embodiments, the clamp lock 140 can further comprise a catch. The catch can be configured to selectively prevent rotation of the cam lever about its rotatable connection to the linkage in at least one direction. In the example mount depicted, the catch is in the form of a biased detent 170, although other kinds of catches can also be used with clamp lock 140 as described. The biased detent 170 is partially housed in the second portion 134 of clamp 130 and is rotatable about a pin 171 disposed inside (shown in FIG. 8). A spring 172 (partially visible in FIGS. 3A, 4A, and 5A)

biases the biased detent 170 so that it stands proud of the second portion 134 of clamp 130 when the clamp 130 is unlocked, as shown in FIGS. 2A-5D. The detent 170 is complemented in the example mount depicted in these Figures by an aperture 169 (shown for example in FIG. 2A) that is defined by the body of the cam lever 160. The aperture 169 defined by cam lever 160 is configured to receive and engage with detent 170 as described below.

Figure 8:
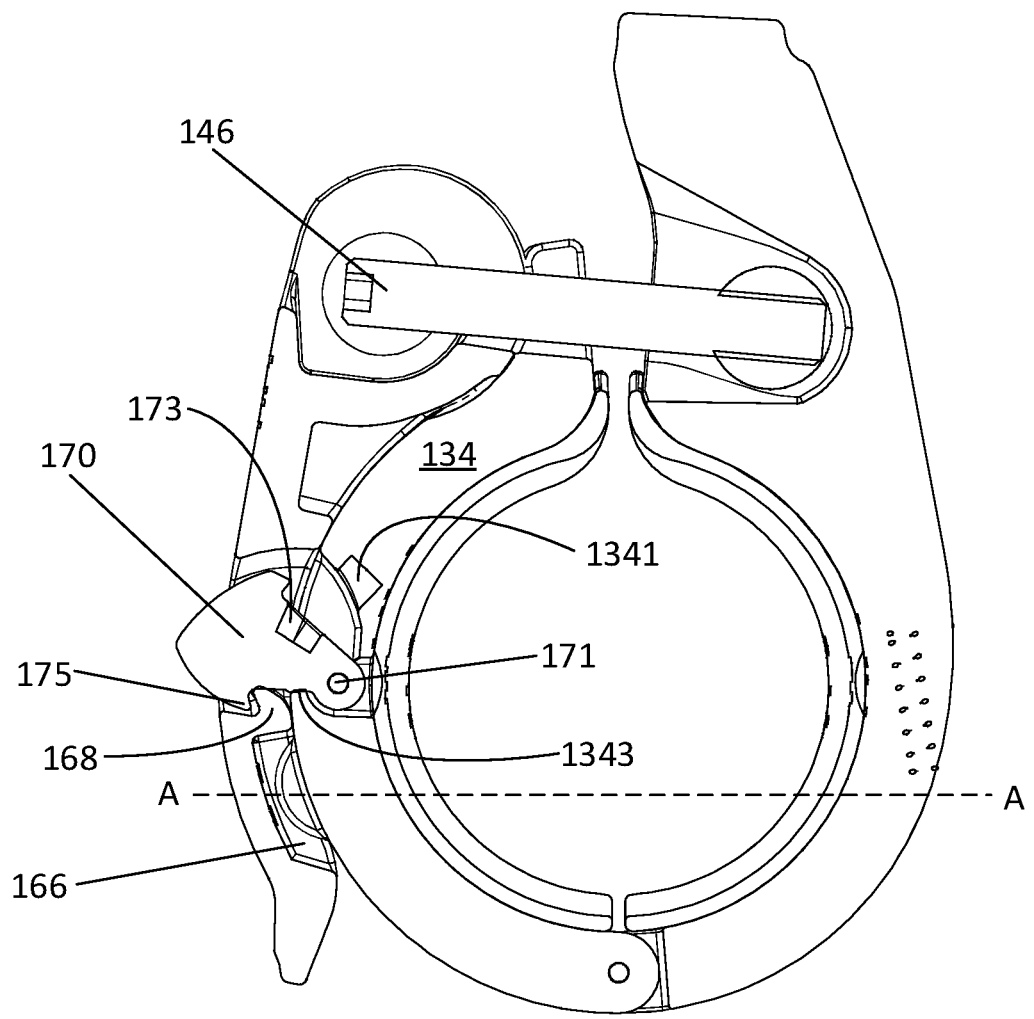
FIG. 8 shows a portion of a mount in cross-section.

FIG. 8 shows a portion of example mount 100 taken in cross-section with the clamp 130 selectively locked by clamp lock 140. This perspective shows the recess 173 formed in detent 170 for the spring 172 (which is not depicted in this figure for clarity) and the corresponding recess 1341 defined in the second portion 134 of clamp 130 for spring 172. The maximum extent of rotation of detent 170 about pin 171 is restricted by abutting edge 1343 of the second portion 134 of clamp 130.

The detent includes lip 175 that is shaped to engage with complementary hook 168 of the cam lever 160. In this example, the hook 168 is disposed towards the bottom of aperture 169 defined by cam lever 160. When the clamp 130 is selectively locked by clamp lock 140, as in the case with FIGS. 1A and 1B, the lip 175 and hook 168 act to substantially prevent rotation of cam lever 160 in the unlocking direction. If a force does urge cam lever 160 to rotate in the unlocking direction (that is, counter-clockwise with respect to pivot 146 as viewed from the perspective of FIG. 8), then the lip 175 engages with hook 168. The relative positioning of the lip 175, hook 168, and pin 171 means that the hook 168 exerts a force that is substantially horizontal from the perspective of FIG. 8. The direction of this force is substantially parallel with the radial vector of detent 170 (that is, a vector drawn from the point of rotation about pin 171 to the point where the lip 175 and hook 168 engage), meaning the detent experiences only a minimal torque in the unlocking direction (that is, counter-clockwise with respect to pin 171 as viewed from the perspective of FIG. 8.) The detent 170 therefore does not appreciably rotate and remains in place, substantially preventing rotation of cam lever 160 in the unlocking direction due to the engagement between hook 168 of cam lever 160 and lip 175 of detent 170.

To unlock detent 170 so that cam lever 160 can be rotated in the unlocking direction, a user can manipulate detent 170 to rotate it about pin 171. This brings the hook 168 out of engagement with lip 175 and allows the cam lever 160 to freely rotate about its rotational connection 146 to linkage 150.

The catch can therefore help prevent accidental unlocking of clamp lock 140, for example due to vibrations or accidental contact by the rider or additional passenger of the vehicle. Although the catch depicted in these examples is a biased detent, this is not intended to be limiting. Numerous other kinds of catches—such as clasps or latches—may be used in other instances where appropriate. For example, cam lever 160 can include a projection that cooperates with a clasp connected to clamp 130 (or vice versa) to substantially prevent rotation of cam lever 160, similar to the kind of clasp that is commonly used to lock pruning shears or secateurs. In still further examples, the catch can comprise a ratchet and pawl that substantially prevents rotation of cam lever 160 when the clamp 130 is selectively locked by clamp lock 140. The cam lever can then be released by manipulating the pawl to bring it out of engagement with the ratchet. In still further examples, the mount may omit a catch.

Projections

The example mount depicted comprises projections 181 and 182 that are integrally formed with the second portion 134 of clamp 130. The projections 181 and 182 are configured to support cam lever 160 when the clamp 130 has been selectively locked by clamp lock 140. Cam lever 160 includes a corresponding recess 166 (shown in cross-section in FIG. 8) that receives projections 181 and 182 when the cam lever 160 is flush against clamp 130 (that is, when clamp 130 is selectively locked by clamp lock 140).

Figure 9:
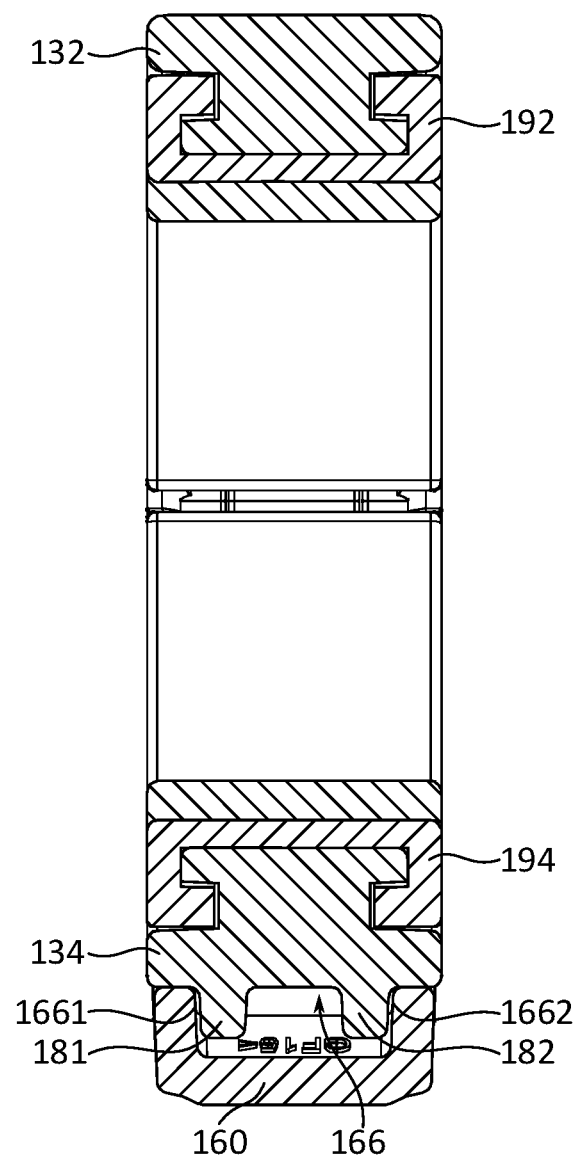
FIG. 9 further shows a portion of the mount in cross-section.

FIG. 9 shows a cross-section of cam lever 160 and clamp 130 taken along line A-A in FIG. 8. First projection 181 and second projection 182 are disposed within recess 166 defined by cam lever 160. When the cam lever 160 is flush against clamp 130 and is seated correctly, the first projection 181 and second projection 182 are respectively separated from first and second inner sidewalls 1661 and 1662 by a small distance. If cam lever 160 experiences a lateral force (that is, in the horizontal direction when viewed from the perspective of FIG. 9), first projection 181 will abut first inner sidewall 1661 or second projection 182 will abut second inner sidewall 1662, depending on the direction of the force/displacement. The abutting surfaces will then substantially prevent further displacement of cam lever 160 relative to the second portion 134 of clamp 130. The projections 181 and 182 can therefore also help to mitigate out-of-plane rotation of cam lever 160 in conjunction with the complementary shape of cam lobe 165 and seat 138, as described above.

While the example mount depicted has two projections 181 and 182, this is not intended to be limiting. In other examples, the mount may include a single projection or more than two projections. In still further examples, the mount may include projections disposed at different locations on the mount. For example, the mount may include projections on the cam lever 160 and recesses on clamp 130. Furthermore, other example mounts may omit projections entirely.

Removable Inserts

As discussed, the clamp 130 of mount 100 is configured to secure the mount 100 to the primary handlebars of a bicycle (as shown in FIG. 11). As the shape and dimensions of the primary handlebars can vary, clamp 130 can further comprise removable inserts 192 and 194 to allow use of the mount with primary handlebars of various shapes and dimensions.

In the example depicted, the removable inserts comprise a first portion 192 that couples to the first portion 132 of clamp 130, and a second portion 194 that couples to the second portion 134 of clamp 130. FIG. 8 shows an example of how the removable inserts 192 and 194 couple to clamp 130, although other coupling arrangements are possible. If the mount 100 is to be used with primary handlebars 99 of a different diameter, then the removable inserts 192 and 194 are removed from clamp 130 and replaced with other removable insert of the appropriate size. The clamp 130 is then ready to be secured to the primary handlebars.

The removable inserts 192 and 194 can be at least partially formed from natural or synthetic rubber. This can help provide additional grip due through friction and can protect the primary handlebars. Other materials with comparable friction and durability can also be used. The removable inserts 192 and 194 may be configured for use with primary handlebars that have a diameter of about 31.8 millimetres or about 35 millimetres, as these are diameters that are commonly used. Removable inserts may also be configured for use with other sized or shaped handlebars as appropriate.

Male Key and Female Keyways

The example of the mounting assembly 50 depicted includes two separate mounts 100 and 100', as shown in FIG. 11, that are spaced apart by a distance when clamped to primary handlebars 99. The spacing between each mount 100 and 100' can be varied by choosing where each mount respectively clamps to the primary handlebars, meaning that the mounting assembly 50 can be used with a wider variety of primary handlebars or can be adjusted for user preference. The spacing between each mount 100 and 100' likewise determines the spacing between each fastener 110 and 110' on auxiliary handlebars 90, meaning that the mounting assembly 50 can also be used with a wider variety of auxiliary handlebars. However, if the two mounts are entirely separate, then one mount can potentially be rotated about the primary handlebars without the other mount being affected. This can lead to relative rotation of one mount with respect to the other mount.

Figure 10A:
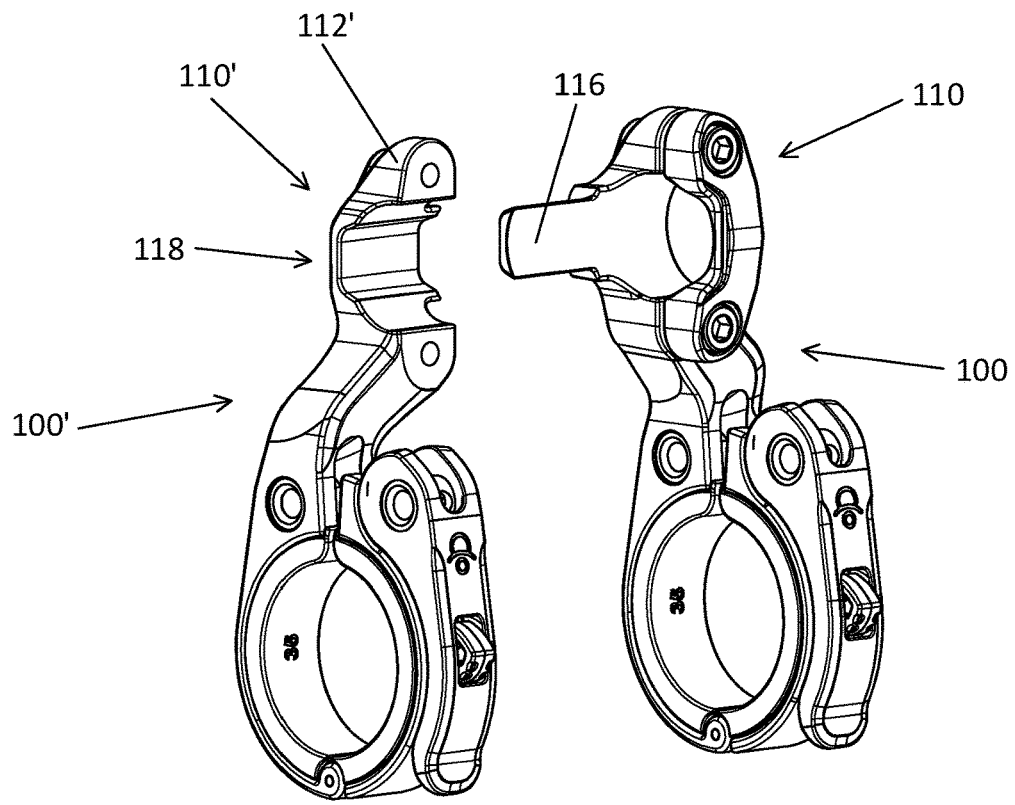
FIG. 10A shows two example mounts.

FIG. 10A depicts first mount 100 and second mount 100' with auxiliary handlebars 90 omitted. In this example, first mount 100 comprises a male key 116 and second mount 100' comprises a female keyway 118. The male key 116 and female keyway 118 form a keyed joint and are configured to prevent rotation of the first mount 100 relative to the second mount 100', and vice versa. The distance between the first mount 100 and second mount 100' in this figure has been exaggerated for the sake of illustration. In the example depicted in FIG. 10A, the male key 116 projects from and is integral with the first portion 112 of fastener 110 of first mount 100, whilst the female keyway 118 is defined by the first portion 112' of fastener 110' of second mount 100'. The second portion of fastener 110' of second mount 100' has been removed in this figure to better illustrate female keyway 118.

Figure 10B:
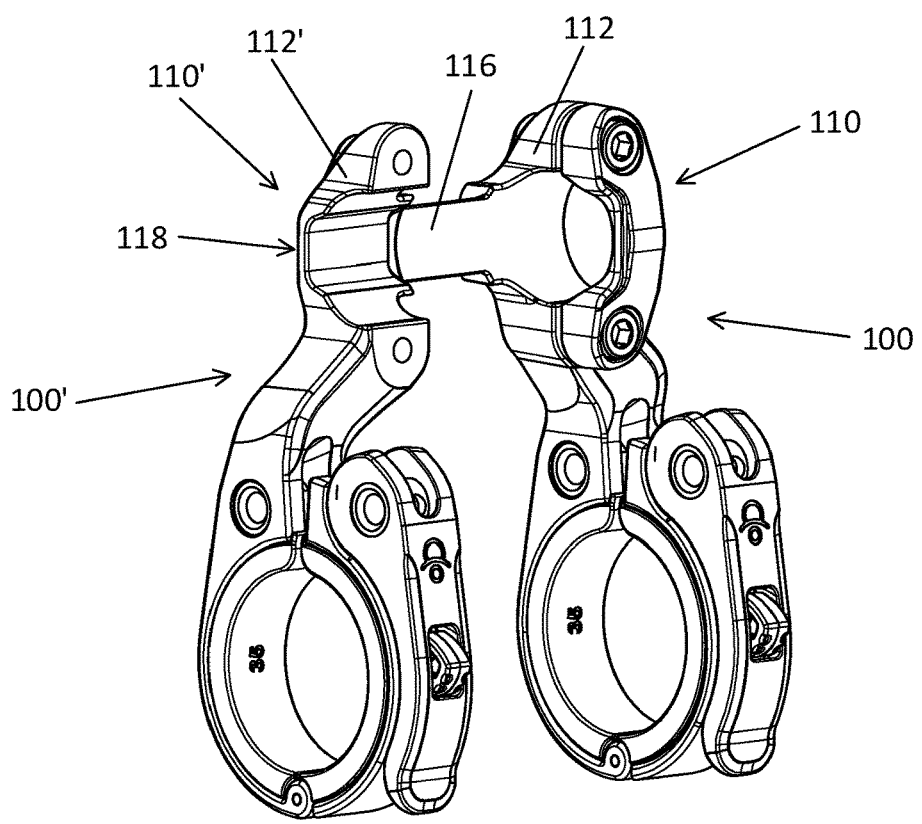
FIG. 10B further shows two example mounts.

FIG. 10B depicts the first mount 100 and second mount 100' closer together so that male key 116 has entered female keyway 118. Female keyway 118 in this example extends across the width of the first portion 112' of fastener 110' and passes through to the other side, although blind female keyways may be used in other examples. The extent of the male key 116 that is received by female keyway 118 then depends at least partially on the spacing between first mount 100 and second mount 100'. The complementary shapes of male key 116 and female keyway 118 are such that the keyed joint formed by the male key 116 within female keyway 118 transfers torque between first mount 100 and second mount 100'. This can help mitigate rotation of one mount 100 or 100' relative to the other mount about the primary handlebars. If either mount does rotate to some extent about the primary handlebars, then the male key 116 and female keyway 118 will cause the other mount to rotate to substantially the same extent.

Although the male key 116 and female keyway 118 in this example respectively project from and are defined by fasteners 110 and 110', this is not intended as a limitation. In other examples, the male keyway and female keyway may be positioned elsewhere on each respective mount. Furthermore, although a single male key 116 and female keyway 118 are shown here, other examples may include multiple male keys and corresponding female keyways. In some examples, each mount may include one or more male keys and one or more female keyways. For example, each mount may include a male key and female keyway configured to engage with an opposing mount's female keyway and male key. The shape and size of any male keys and female keyways may also vary in other examples of mounts. In still further examples, the mounts may omit the male key and female keyway.

Mounting Systems in Use

FIG. 11 depicts example mounting system 50 (comprising example mounts 100 and 100') mounted to primary handlebars 99 (of, for example, a bicycle or scooter). The clamp locks 140 and 140' are arranged so that cam levers 160 and 160' face away from the rider when installed on primary handlebars 99. This can reduce the chance that the clamp locks 140 or 140' or other components of mounts 100 and 100' encroach on the rider's seat, potentially giving the rider more room and increasing the overall safety of mounting system 50. This also reduces the chances that a child or other rider may unintentionally unlock either clamp lock 140 or 140' whilst riding the bicycle or other vehicle.

In summary, the mounts and mounting systems disclosed can be locked by hand, without a user having to use a separate tool and with relative ease. The two-stage clamp lock used with the example mounts is secure and can remain locked under vibration. The mounts can comprise a number of further features such as projections and shaped cam lobes and seats to help mitigate unintentional rotation of cam levers. Removable inserts can be used to widen the range of primary handlebars that are compatible with the mounts. Male and female keyways can be utilised if two mounts are used in a mounting system.

Although the mounts are primary described in the context of bicycles, this is not intended as a limitation. The mounts and mounting systems can be used with other kinds of vehicles (such as scooters) that use primary handlebars.

Interpretation

The term "comprises" and other grammatical forms is intended to have an inclusive meaning unless otherwise noted. That is, they should be taken to mean an inclusion of the listed components, and possibly of other non-specified components or elements.

Where the term "about" is used in relation to a numerical measurement, this should be taken as referring to that measurement plus or minus a tolerance that would be considered reasonable in the context.

While the present disclosure has been explained by the description of certain embodiments, the disclosure is not restricted to these embodiments. It is possible to modify these embodiments without departing from the spirit or scope of the disclosure.

The invention claimed is:

1. A mount for an auxiliary handlebar, the mount comprising:
   a stem;
   a fastener configured to receive the auxiliary handlebar;
   a clamp configured to secure the mount to a primary handlebar; and
   a clamp lock comprising:
      a linkage rotatably connected to the stem; and
      a cam lever rotatably connected to the linkage;
   wherein the clamp lock is configured to selectively lock the clamp; and
   wherein the clamp lock further comprises a catch and the catch is a biased detent.

2. The mount of claim 1 further comprising a projection configured to support the cam lever when the clamp is locked.

3. The mount of claim 2 further comprising a plurality of projections configured to support the cam lever when the clamp is locked.

4. The mount of claim 1 further comprising a removable insert.

5. The mount of claim 4 wherein the removable insert is configured for a primary handlebar of about 31.8 millimetres.

6. The mount of claim 4 wherein the removable insert is configured for a primary handlebar of about 35 millimetres.

7. The mount of claim 1 wherein the cam lever comprises a cam lobe configured to mitigate out-of-plane rotation of the cam lever.

8. The mount of claim 7 wherein the cam lever is generally convex.

9. The mount of claim 1 further comprising a seat configured to mitigate out-of-plane rotation of the cam lever.

10. The mount of claim 9 wherein the seat is generally concave.

11. The mount of claim 1 further comprising a male key.

12. The mount of claim 1 further comprising a female keyway.

13. A mounting system for an auxiliary handlebar, the mounting system comprising a plurality of mounts as claimed in claim 1.

14. The mounting system of claim 13, wherein:
a first mount comprises a male key; and
a second mount comprises a female keyway;
wherein the male key and female keyway form a keyed joint configured to mitigate relative rotation of the first mount with respect to the second mount.

* * * * *